United States Patent [19]
Lurie

[11] Patent Number: 5,371,670
[45] Date of Patent: Dec. 6, 1994

[54] THREE-PARAMETER TUNABLE TILT-INTEGRAL-DERIVATIVE (TID) CONTROLLER

[75] Inventor: Boris J. Lurie, La Crescenta, Calif.

[73] Assignee: The United States of America as represented by the Administrator of the National Aeronautics and Space Administration, Washington, D.C.

[21] Appl. No.: 23,253

[22] Filed: Feb. 1, 1993

[51] Int. Cl.⁵ .............................. G05B 13/02
[52] U.S. Cl. .................... 364/160; 364/148; 364/162
[58] Field of Search .............. 364/148, 160, 162

[56] References Cited

U.S. PATENT DOCUMENTS

| | | | |
|---|---|---|---|
| 4,146,270 | 3/1979 | Nurnberger et al. | 318/610 |
| 4,539,633 | 9/1985 | Shigemasa et al. | 364/162 |
| 4,549,123 | 10/1985 | Hägglund et al. | 318/610 |
| 4,619,230 | 10/1986 | Collonia | 123/325 |
| 4,641,235 | 2/1987 | Shigemasa et al. | 364/149 |
| 4,754,391 | 6/1988 | Suzuki | 364/157 |
| 4,755,924 | 7/1988 | Hiroi | 364/148 |
| 5,059,880 | 10/1991 | Hiroi | 318/610 |

*Primary Examiner*—Paul Gordon
*Attorney, Agent, or Firm*—John H. Kusmiss; Thomas H. Jones; Guy M. Miller

[57] ABSTRACT

A feedback control system compensator of the PID type is provided, wherein the proportional component of the compensator is replaced with a tilted component having a transfer function s to the power of $-1/n$. The resulting transfer function of the entire compensator more closely approximates an optimal transfer function, thereby achieving improved feedback controller. Further, as compared to conventional PID compensators, the TID compensator allows for simpler tuning, better disturbance rejection ratio, and smaller effects of plant parameter variations on closed loop response.

6 Claims, 6 Drawing Sheets

5,371,670

THREE-PARAMETER TUNABLE TILT-INTEGRAL-DERIVATIVE (TID) CONTROLLER

ORIGIN OF THE INVENTION

The invention described herein was made in the performance of work under a NASA contract, and is subject to the provisions of Public Law 96-517 (35 U.S.C. Section 202) in which the Contractor has elected not to retain title.

TECHNICAL FIELD

The invention generally relates to feedback control systems and, more particularly, relates to three-parameter tunable feedback control systems.

BACKGROUND ART

A feedback control system is commonly employed to control the operation of a plant to achieve and maintain its desired output characteristic in response to the applied command or reference signal. A conventional feedback control system, FIG. 1, measures a parameter which is representative of the output of the system and exploits changes in the detected parameter to vary operational characteristics of the plant or system to regulate the system and provide a desired output. The feedback control system includes a compensator, connected within a continuous feedback loop for modifying the signal to appropriately vary the operational parameters of the system via an actuator. The major goals for the feedback control system are to minimize the effect of disturbances at the output of the system, and to minimize sensitivity of the closed loop response to plant parameter variations. To satisfy these requirements, the feedback of the system, properly weighted in frequency, must be maximized. These constraints uniquely define the optimal transfer function for the feedback loop. The purpose for the compensator of the feedback system is to implement a loop response reasonably close to the optimal. Often, a prefilter is employed prior to the feedback loop to appropriately filter the command signals to enable the system to respond more precisely to the command.

A commonly-used compensator employed in feedback control systems is a proportional-integral-derivative (PID) compensator which provides for varying degrees of gain and phase shift of the signal according to the frequency of the signal. In the prior art feedback system of FIG. 1, the PID compensator is characterized by a transfer function $I/s + P + Ds$, where s is a Laplace transform variable. $R(s)$ represents the transfer function of a prefilter. The scalar parameters P, I, and D and the prefilter transfer function $R(s)$ are tuned for optimal performance.

FIG. 2 provides Bode diagrams for transfer functions of each path of the compensator and for the entire compensator. The Bode diagrams provide a frequency domain representation of the gain in decibels as a function of frequency. FIG. 2 illustrates that proportional component P dominates at midrange frequencies, integral component $I/s$ at lower frequencies, and derivative component $Ds$ at higher frequencies.

The transfer functions which mathematically characterize the effect of the PID compensator are represented, in accordance with conventional mathematical notation, by the location of various transfer function poles and zeroes in the complex Laplace plane. The conventional PID compensator transfer function typically has two real zeros, as shown in FIG. 3. At the frequencies of the zeros, which correspond to the crossing points of the two asymptotes in FIG. 2, the total feedback gain provided by the compensator is about 3 dB higher than the gain of each of the two components. Typically, the P term dominates near $f_b$, the Ds term dominates at frequencies over $4f_b$, and the $I/s$ term dominates at frequencies up to $f_b/4$, where $f_b$ is the crossover frequency at which loop gain is 0 dB.

After the feedback is maximized and the closed loop response from a summer of the system to the output of the system is calculated, the prefilter transfer function $R(s)$ is chosen to yield the desired output response to a certain command.

A theoretically optimal loop response has been determined by Bode. For the purpose of industrial control, a simplified suboptimal Bode loop response can be employed. The suboptimal response is illustrated in FIG. 4 by a solid line. The slope of this suboptimal gain response is about $-10$ dB/octave. The transcendental loop transfer function which characterizes the suboptimal response can be closely approximated by a rational function.

As can be seen from FIG. 4, rather sharp corners occur at the sides of the Bode step. Any smoothing of the corners, especially the left one, caused by an improper or inaccurate rational function approximation, reduces the available feedback, resulting in reduced performance.

A typical loop gain Bode diagram of the system with a PID compensator is shown in FIG. 4. When provided with the same stability margin and the same average loop gain as an optimal Bode controller, the crossover frequency $f_b$ of the PID controller is about one-half that of the optimal Bode loop response. The feedback at frequency $f_b/4$ is about 10 dB lower than that of a simplified Bode controller.

The conventional PID controller illustrated in FIG. 1 is in common use. When applied to a great variety of plants, the PID controller is easy to tune to provide robust and fairly good performance. However, the performance is not optimal.

STATEMENT OF THE INVENTION

It is an object of the invention to provide an improved feedback loop compensator having the advantages of the conventional PID compensator, but providing a response which is closer to the theoretically optimal response.

This object, and other general objects of the invention, are achieved by the provision of a three-component tunable feedback loop control system having a PID-type compensator wherein the proportional compensating unit is replaced with a compensator having a transfer function characterized by $1/s^{(1/n)}$. This compensator is herein referred to as a "Tilt" compensator, as it provides a feedback gain as a function of frequency which is tilted or shaped with respect to the gain/frequency of a conventional or positional compensation unit. The entire compensator is herein referred to as a Tilt-Integral-Derivative (TID) compensator. For the Tilt compensator, n is a nonzero real number, preferably between 2 and 3. Thus, unlike the conventional PID controller, wherein exponent coefficients of the transfer functions of the elements of the compensator are either 0, $-1$, or $+1$, the invention exploits an exponent coefficient of $-1/n$. By replacing the conventional proportional compensator with the tilt compensator of the invention, an overall response is achieved which is closer to the theoretical optimal response determined by Bode.

In accordance with a preferred embodiment of the invention, the integral portion of the compensator has a transfer function (I) characterized by $-1/s$, and the derivative portion of the compensator has a transfer function (D) characterized by s. The three components of the compensator are connected in parallel along a control line between a summer which receives and sums a control signal from a plant with a feedback signal received along a feedback path, and an actuator or control unit which controls the plant in response to the compensated control signal output from the compensator. The feedback path connects the plant control variable to the summer.

Also in accordance with the preferred embodiment, a prefilter is provided along the command signal path prior to the summer for prefiltering the command signal. A preferred transfer function for the prefilter is:

$$R(s)=(s^2+2\omega_b S+\omega_b^2)/(s^2+5.25\omega_b S+\omega_b^2) \quad (1)$$

The TID compensator of the invention, particularly in combination with the prefilter, achieves a feedback control response which is improved over the response of a conventional PID compensator. However, the TID compensator of the invention retains many of the advantages of the conventional PID compensator, including ease in tuning. Further, the TID compensator retains the general structure of a PID compensator by employing three parallel paths having tunable scalar gains. Preferably, each of the three paths has the phase shift and the slope of the gain response frequency independent. This provision helps ensure that the TID compensator is universal with respect to the plants with different bandwidths, i.e., the controller is easily implemented in feedback systems which previously employed a PID controller. By providing each of the paths of the three-component compensator of the invention with a transfer function characterized by s or a power of s, the phase shift and slope of the gain response are both rendered frequency independent, thus ensuring that the compensator is substantially universal.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a three-parameter tunable feedback loop compensator employing a controller having a tilted gain as a function of frequency in place of a conventional proportional compensator unit.

Figure 5:
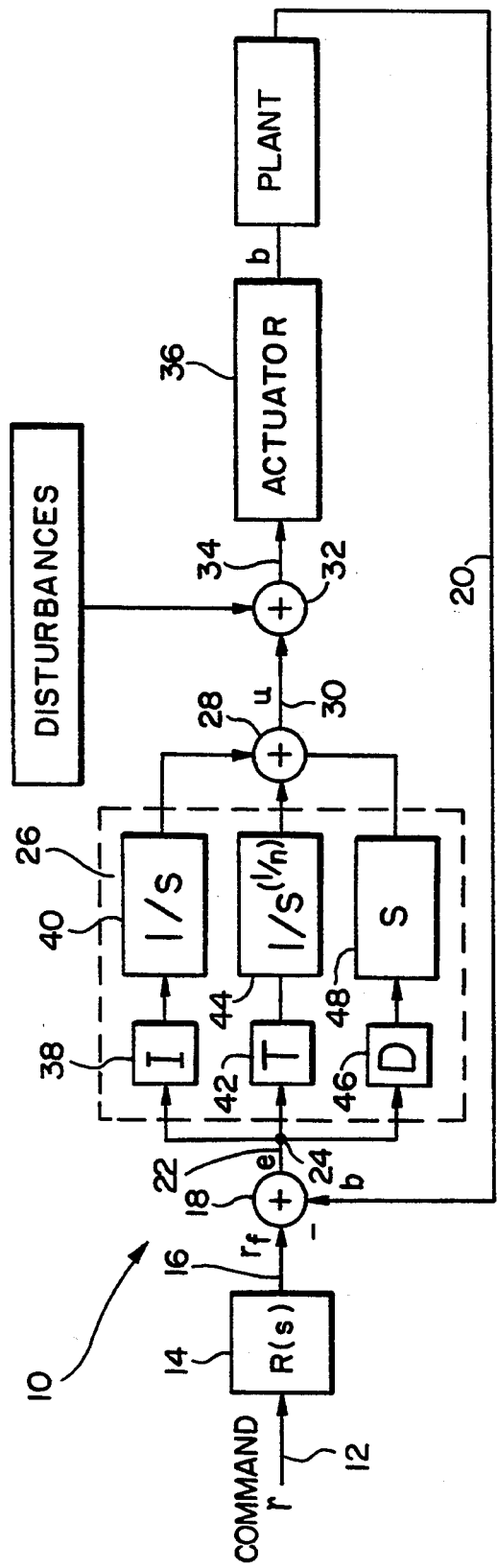
FIG. 5 provides a block diagram illustrating a feedback control system constructed in accordance with a preferred embodiment of the invention, wherein a conventional proportional compensator is replaced with a compensator having a tilted gain as a function of frequency.

Referring to FIGS. 5-15, a preferred embodiment of the invention will now be described. FIG. 5 provides a block diagram schematic of a feedback control system 10 receiving an input reference or command signal r along an input line 12. Reference input signal r is prefiltered by a prefilter 14 having a transfer function R(s). A filtered reference signal $r_f$ is output from prefilter 14 along line 16 to a summer or summing point 18 where $r_f$ is combined with a primary feedback signal b received along feedback path 20.

Summer 18 outputs an actuating or error signal e along line 22, where $e=r_f \pm b$. Error signal e is applied along three paths at takeoff point 24 for parallel filtering by a set of control elements, generally denoted 26. Individual signals output from individual elements within block 26 are combined by a summer 28 to yield a control signal u output along path 30. Disturbances, if any, are combined with control signal u at a summer 32. The resulting signal is fed via path 34 into an actuator 36. Output from actuator 36 is fed back to summer 18 along data line 20 as primary feedback signal b.

Control element block 26 includes three tunable elements: an integral compensator 38 having a transform 1/s, represented in FIG. 5 by block 40; a tilt compensator 42 having a transform function $1/s^{(1/n)}$, represented by block 44; and a derivative compensator 46 having a transform s represented by block 48.

Figure 1:
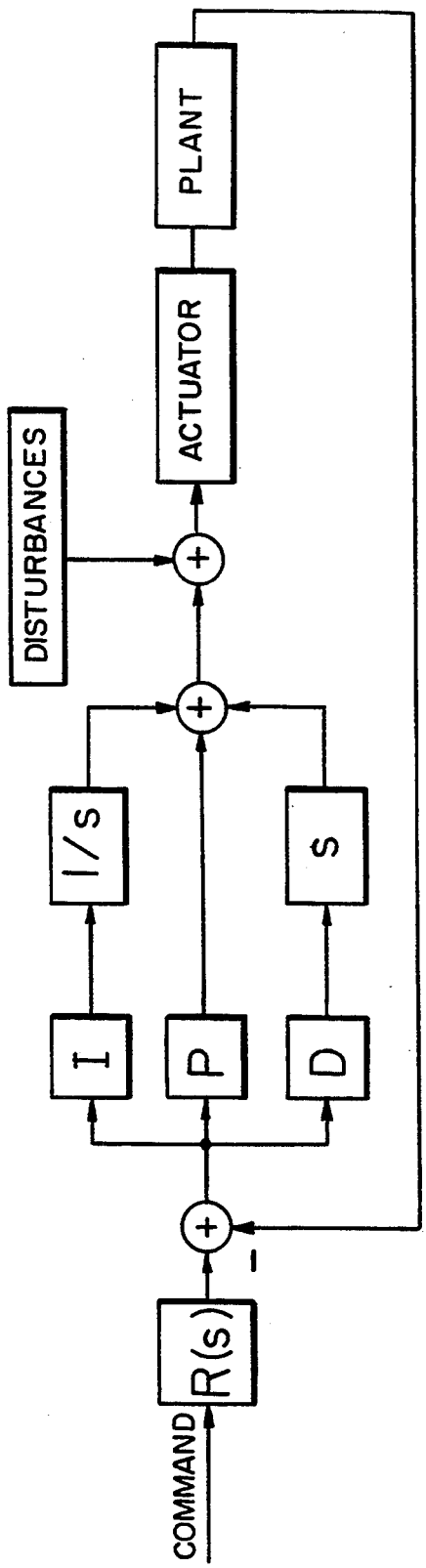
FIG. 1 provides a block diagram illustrating a conventional prior art PID feedback control system.
Figure 2:
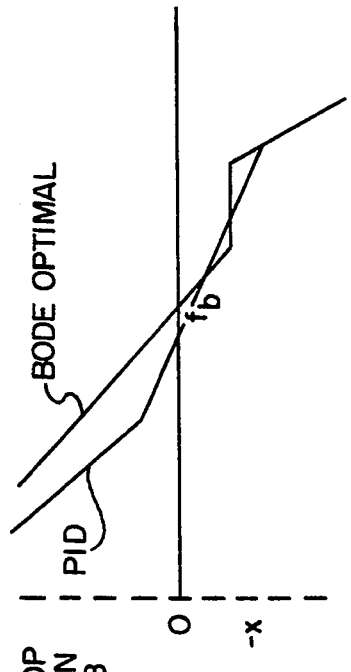
FIG. 2 provides a Bode diagram of the transfer functions of the feedback control system of FIG. 1.
Figure 3:
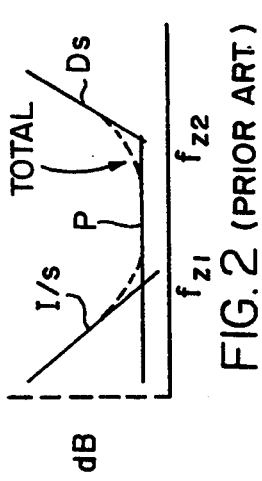
FIG. 3 provides a complex plane representation of the poles and zeros of the feedback control system of FIG. 1.
Figure 4:
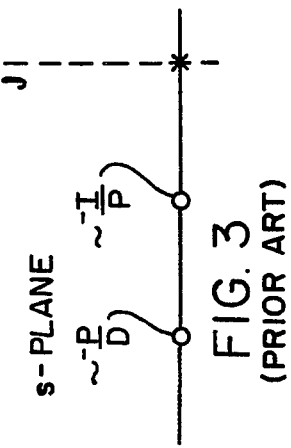
FIG. 4 provides a graphical illustration of the suboptimal Bode loop response for a feedback control compensator.
Figure 6:
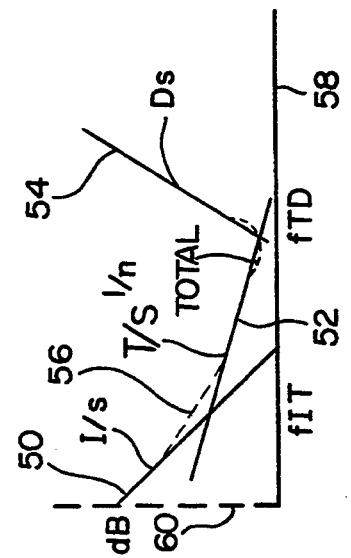
FIG. 6 provides a Bode diagram of the transfer functions of the feedback control system of FIG. 5.
Figure 8:
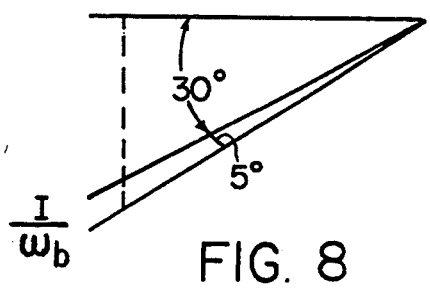
FIG. 8 provides a vector illustration of the phase stability margin of the TID compensator of FIG. 5.

A Bode plot of the transforms of control elements 26 is represented in FIG. 6, along with respective crossing frequencies. As can be seen from FIG. 6, unlike a conventional PID controller (FIG. 2), which yields a flat proportional component, the controller of the invention yields a tilted midfrequency component having decreasing gain with increasing frequency. In FIG. 6, the Bode plots of the individual elements are represented by solid lines, whereas the resulting combination is represented by dashed lines. More particularly, the Bode plot of integral component 38 is represented by solid line 50, the Bode plot of tilt compensator 42 is represented by bold line 52, and the Bode plot of derivative element 46 is represented by solid line 54. The resulting combination is represented by dashed line 56. Axis 58 represents frequency and axis 60 represents gain. Tilting the central frequency attenuation component to provide decreasing gain with increasing frequency yields a sharper corner component at crossover frequency fTD.

In the transform of the tilt compensator, n may be any nonzero real number, but preferably is a real number between 2 and 3. Throughout the following, a value of 3 is employed for n. It will be appreciated by those skilled in the art that a different value of n will result in somewhat differing characteristics. With n=3, the respective corner frequencies illustrated in FIG. 5 are:

$$fIT = [(I/T)^{(3/2)}]/(2\pi) \qquad (2)$$
$$fTD = [(I/D)^{(3/4)}]/(2\pi)$$

Figure 7B:
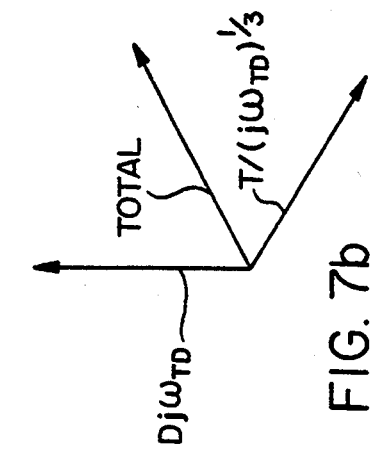
FIGS. 7a and 7b provide graphical illustrations of the vector components of an output signal generated by a PID compensator and a TID compensator, respectively.
Figure 7A:
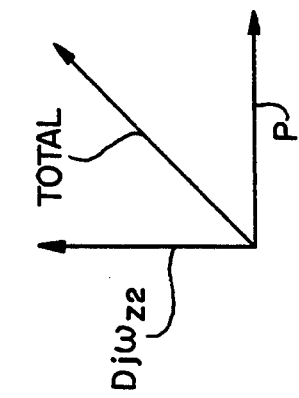

The compensator gain at the corner frequencies at the joint of the bands of dominance of the tilt component and the derivative component is particularly important. The vector diagrams in FIGS. 7a and 7b represent the components forming the output signal of the compensator at the corner frequency for PID control and TID control, respectively. The total signal amplitude in the PID compensator is $\sqrt{2}$ larger (i.e., 3 dB larger) than each of the components, but in the TID compensator, total signal amplitude is the same as the amplitudes of the components. As a result, the corner of the TID gain frequency response is sharper than the corresponding corner in the PID compensator. This sharper corner achieves a closer approximation of the optimal Bode loop response.

The sharper corner illustrated in FIG. 6, provides a first advantage of the TID compensator of the invention. A second advantage of the TID compensator is a steeper slope of the loop response Bode diagram at the crossover frequency which yields better utilization of the feedback bandwidth. A third advantage is that the frequency band of the integral term dominance is lowered due to the nonzero slope of the T-path transfer function. Consequently, the frequency band where the T-term dominates is wider, and the coefficient I has less effect on the crossover frequency region and the stability margins, thus simplifying system design and tuning.

Increasing the coefficient I improves the system precision at lower frequencies, but reduces the phase stability margin. To resolve this tradeoff, it is reasonable to accept some small reduction in the phase stability margin caused by the term I/s. As such, 5 degrees will be used in the following; i.e., we consider the integral term bounded by the condition that it impairs the phase stability margin at $f_b$ by only 5 degrees, from 35 to 30 degrees. This constraint is illustrated by the vector diagram of FIG. 8. It follows from the diagram that:

$$[T/(2\pi f_b)^{(\frac{1}{3})}](sin35° - sin30°) = I/(2\pi f_b) \qquad (3)$$

such that $$I = 0.25 T f_b^{(\frac{2}{3})}. \qquad (4)$$

Since the term $T/s^{(1/n)}$ eliminates static error, the parameter I can be set to 0 for many problems, thus further simplifying controller tuning.

A suggested tuning procedure for the TID compensator is:
 (a) set I=0, D=0, and set the coefficient T for the loop gain to be 0 dB at a desired crossover frequency $f_b$;
 (b) set D such that the phase stability margin at the crossover frequency is about 5 degrees larger than desired; and
 (c) set $I = 0.25 T F_b^{(\frac{2}{3})}$.

Alternatives to step (b) are: set D such that the closed loop gain at $f_b$ without a prefilter is about 5 dB, or yielding an overshoot, without the prefilter, of about 30%. These are not the only suitable methods of TID controller tuning. Since the TID controller is relatively close, although better, to PID control, various schemes of automatic tuning have been developed for the PID controller will probably work well for timing the TID controller as well.

Figure 9A:
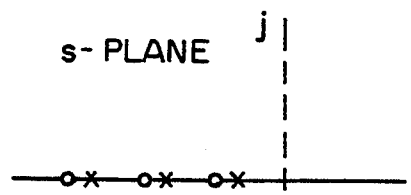
FIG. 9a provides a complex plane illustration of the poles and zeros of the transfer function of the TID compensator of FIG. 5.
Figure 9B:
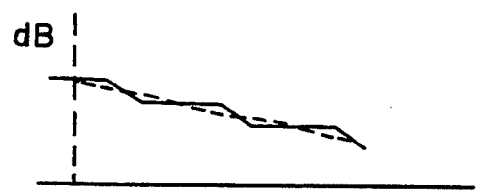
FIG. 9b provides a graphical illustration of the gain response as a function of frequency of the feedback control system of FIG. 5.

The function $s^{(\frac{1}{3})}$ can be approximated by a function having alternating real poles and zeros as shown in a complex plane representation in FIG. 9(a). The resulting gain response is shown in FIG. 9(b). Three poles and three zeros per decade generally suffice to achieve the phase error of less than 1 degree and the amplitude error of less than 0.1 db.

Figure 10A:
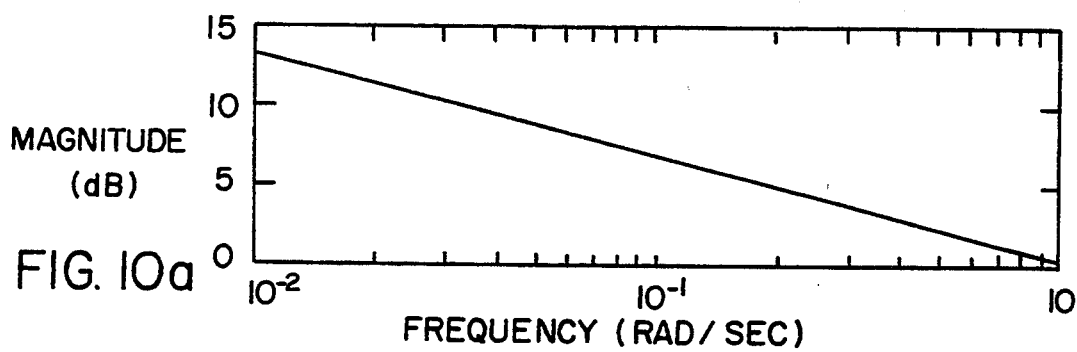
FIGS. 10a and 10b exemplify the gain and phase, respectively, of a rational functional approximation of the transfer function of the T compensator of FIG. 5.
Figure 10B:
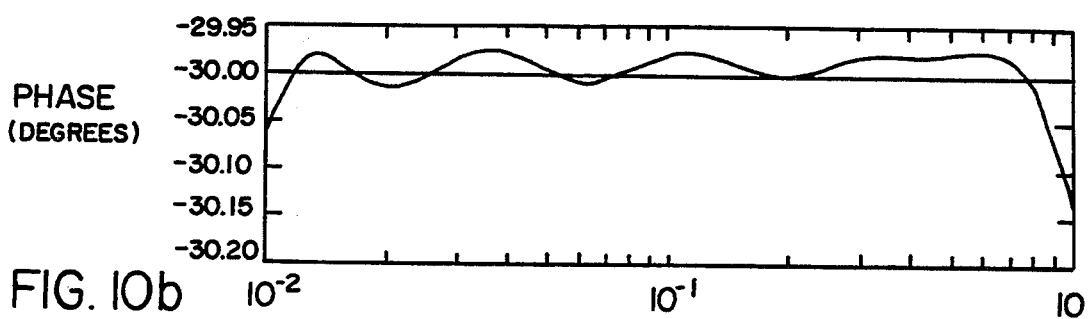

For example, the gain and phase of the function $$F(s) = \frac{0.4415s^6 + 2.234s^5 + 1.861s^4 + 0.4276s^3 + 0.02954s^2 + 0.0005682s + 000002178}{s^6 + 2.42s^5 + 1.3037s^4 + 0.2007s^3 + 0.009201s^2 + 0.00010989s + 0.0000001979} \qquad (5)$$

illustrated in FIGS. 10(a) and (b) are very close to that desired over two decades.

Figure 11:
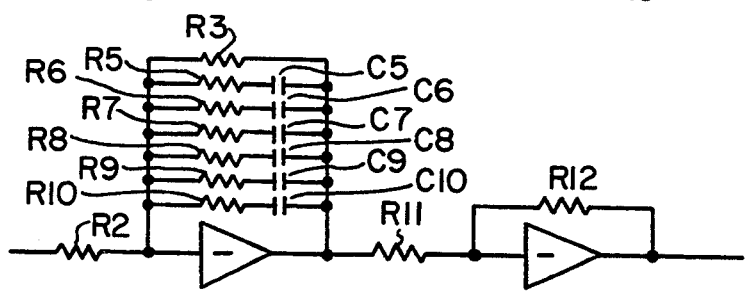
FIG. 11 provides an electrical circuit schematic of an analog circuit implementation of the T compensator of FIG. 5.

When the burden of real-time computation of a transfer function having many poles and zeros is too heavy for the digital processor employed to calculate the transfer function, an analog or hybrid device can be used. FIG. 11 shows an electrical circuit implementation of the transfer function (2) shifted in frequency to cover the band from 1 to 100 Hz.

The resistance and capacitance values of the circuit illustrated in FIG. 11 are provided in Table I.

TABLE I

| | |
|---|---|
| $R_2$ | 54.53K |
| $R_3$ | 598.95K |
| $R_5$ | 39.429K |
| $R_6$ | 184.95K |
| $R_7$ | 308.13K |
| $R_8$ | 423.3K |
| $R_9$ | 563.9K |
| $R_{10}$ | 555.2K |
| $C_5$ | 9.866N |
| $C_6$ | 13.10N |
| $C_7$ | 23.76N |
| $C_8$ | 51.44N |
| $C_9$ | 123.7N |
| $C_{10}$ | 500N |
| $R_{11}$ | 10K |
| $R_{12}$ | 10K |

When the plant and the crossover frequency are known in advance, the tilt block can be designed to approximate the required frequency response over only about a decade of frequency, and a two-pole and two-zero approximation suffices. Since the poles and zeros are both real, the computation need not be performed with high precision.

Generally, if desired, the slope can be made adjustable, for example, using conventional Bode variable equalizer methods.

The typical closed loop system frequency response is similar to a low-pass filter having a "hump" at the end of the passband where the feedback is positive. However, the system transient response to a step-function command of such a system typically suffers from significant overshoot. If the quality of the transient response is important, but no prefilter or command processing is employed, the stability margins are preferably increased over what is otherwise required. However, feedback and disturbance rejection ratios may be significantly degraded.

The goal for the prefilter R(s) is to correct the closed loop response of the feedback system by making the response resemble a Bessel filter response. To this end, the prefilter is a notch filter, with rather broad notches to account for the plant parameter variations from the nominal. The prefilter introduces about 10 dB of attenuation near the crossover frequency. A suitable prefilter function is:

$$R(s) = (s^2 + 2\omega_b S + \omega_b^2)/(s^2 + 5.25\omega_b s + \omega_b^2) \quad (6)$$

The response accuracy of R(s) need not be high, and 1 or 2-dB changes in the gain do not substantially affect the closed loop transient response.

Near the crossover frequency $f_b$, plant parameter variations may cause significant changes in the plant gain, but less significant changes in the plant phase, such as, for example, variations in the mass of a mechanical rigid body plant. The plant gain increment shifts the crossover frequency $f_b$. The steeper the open loop Bode diagram in the vicinity of $f_b$, the smaller the shift in $f_b$ and the resulting prefilter mismatch. In this respect, the TID controller provides a substantial fourth advantage over the PID controller.

With optimized TID compensation, a prefilter designed for optimal performance with the nominal plant also provides acceptable performance when the plant has significant gain variations from the nominal.

The actuator power capability is always limited. For some inputs, the actuator becomes saturated. For example, to reduce the heatup time, the heater of a furnace must deliver full available power up to the saturation level. If no measures are taken, the saturation effect might cause undesirable nonlinear phenomena like wind-up in PID and TID controllers. Conventional nonlinear dynamic compensators can correct such problem. For a more complete discussion of nonlinear dynamic compensators, see B. J. Lurie, "Feedback Maximization," Artech House, Dedham, Mass., 1986.

EXAMPLE

Figure 12:
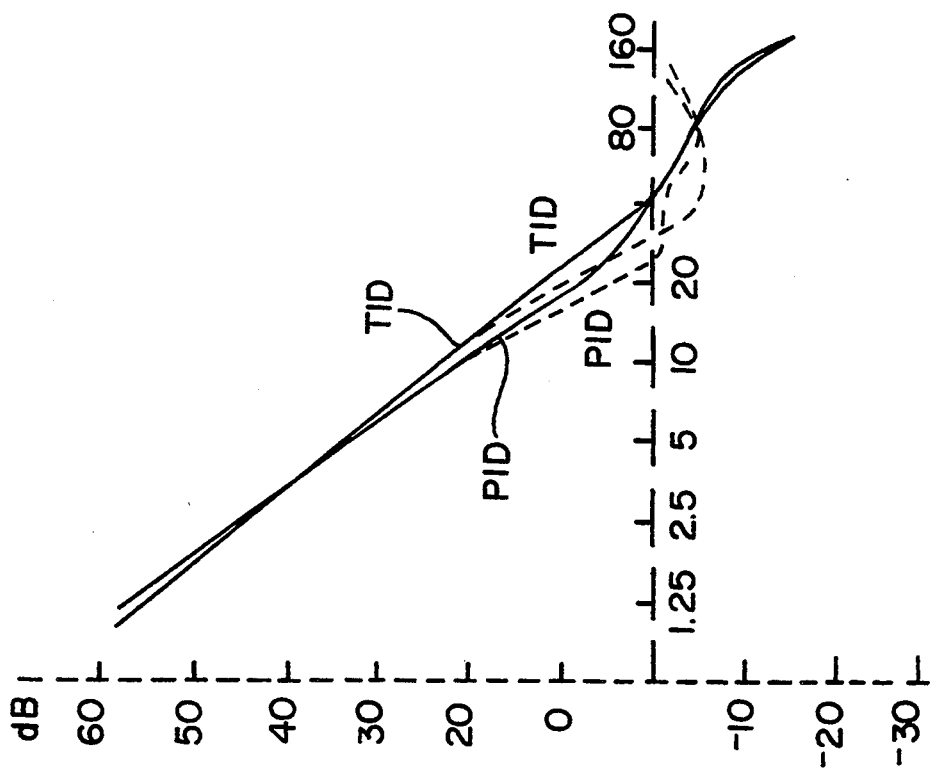
FIG. 12 provides a Bode diagram illustration for the loop gain achieved by the TID compensator of FIG. 5, along with the loop gain for a conventional PID controller and an optimal compensator.

As an example, consider control of a first order plant using a sensor having a transfer function possessing a triple real pole at 80 Hz, with a crossover frequency limited by the sensor noise, of $f_b = 20$ Hz. The Bode diagram for the loop gain achieved with a TID compensator is shown in FIG. 12 by a solid line. For comparison, the best Bode diagram achieved using PID control with the same coefficient D (i.e., the same gain at higher frequencies and, therefore, nearly the same level of high frequency noise) is also shown. As can be seen from FIG. 12, near the crossover frequencies, the TID Bode diagram is steeper than the PID diagram.

The responses for the feedback, i.e., disturbance rejection ratio, are shown by the dotted lines. At the typically critical frequency of about $f_b/2$, the feedback in the TID controller is 5.5 dB larger than that in the PID controller.

Figure 13:
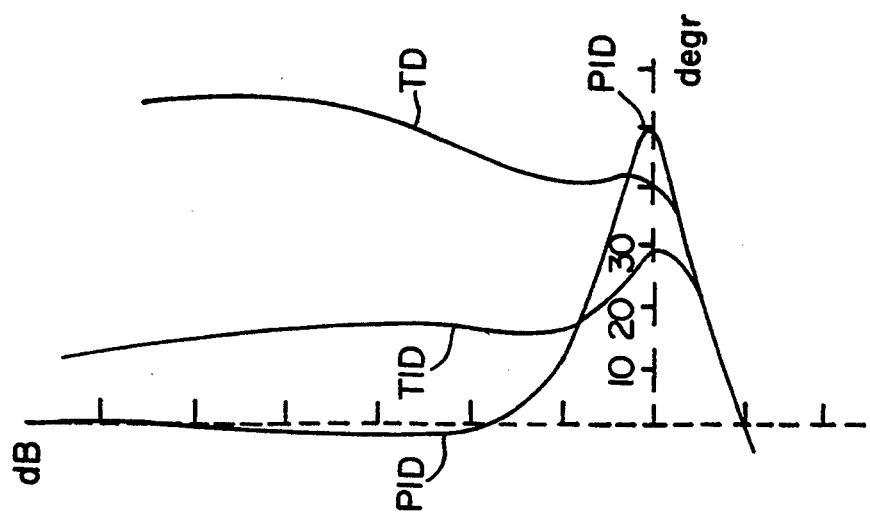
FIG. 13 provides a graphical illustration of a Nichols diagram for a conventional PID controller and for the TID controller of FIG. 5.

FIG. 13 provides Nichols diagrams for the PID compensator to dashed line, and for the TID compensator, solid lines, with the chosen coefficient I. From FIG. 13, it can be appreciated that phase stability margin of the TID compensator near $f_b$ is not excessive. Changing the value of the coefficient I effectively controls the Nichols diagram shape at lower frequencies without causing large changes in the crossover frequency area.

FIG. 13 also illustrates that with a saturation link installed in the integral path, when the signal level increases, the phase lag of the loop describing function decreases, preserving the system global stability.

Figure 14:
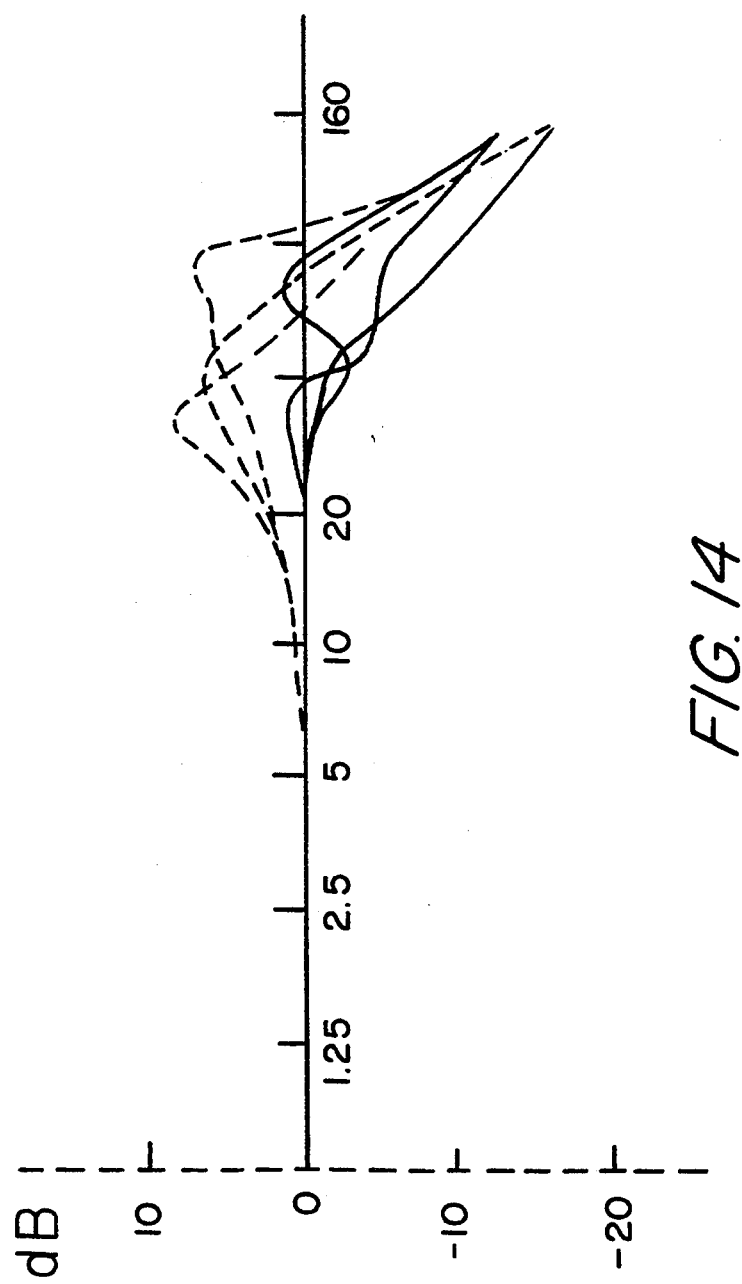
FIG. 14 provides a graphical illustration of the closed loop response as a function of frequency of the feedback control system of FIG. 5, excluding the prefilter.

The closed loop response for the nominal plant and for the plants with the gain increased and reduced by 3-dB with the TID compensator without a prefilter is shown in FIG. 14 by dotted lines. With a prefilter having a transfer function represented by the given equations, the closed loop responses for the nominal plant and for the plant with the gain increased and reduced by 3 dB are shown by solid lines.

Figure 15A:
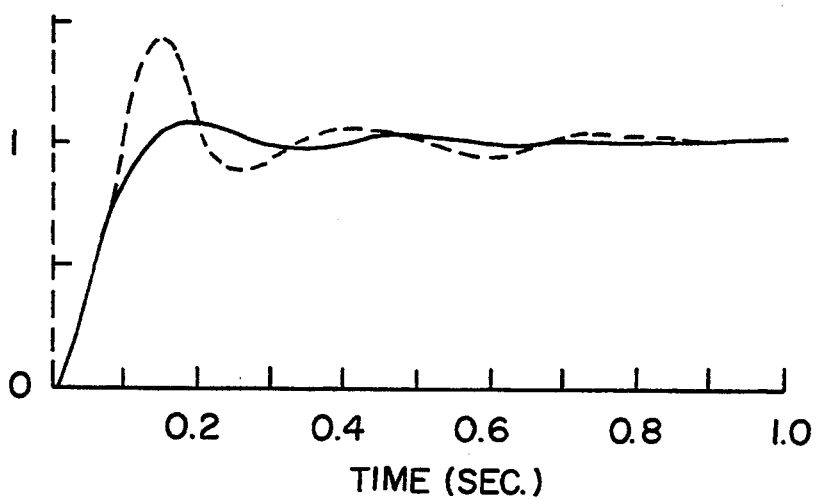
FIGS. 15a, 15b, and 15c provide graphical illustrations of time responses to a step input command for nominal plant gain, maximum plant gain, and minimum plant gain, for the feedback control system of FIG. 5, with and without (dashed line) of the prefilter.
Figure 15B:
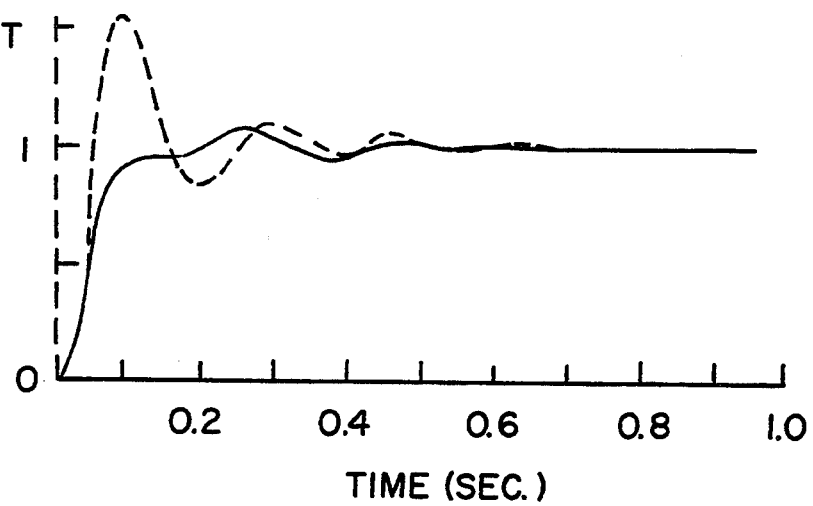
Figure 15C:
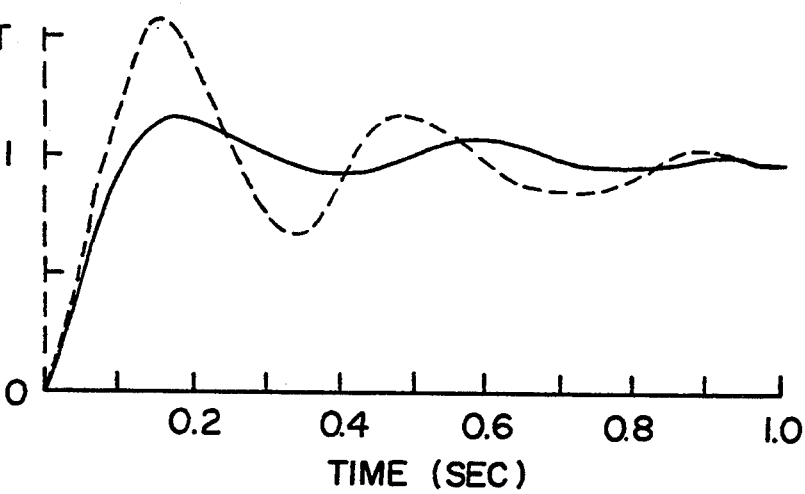

The time-responses to the step-input command for the nominal plant and the plants with the gain increased and reduced by 3 dB are presented in FIGS. 15(a), (b), and (c), with the prefilter, by solid lines, and without the prefilter, by dashed lines. Overshoots with the prefilters, are, correspondingly, 6%, 7.5%, and 20%. This example shows that the prefilter greatly helps to reduce the overshoot, even when the match between the frequency responses of the closed loop plant and the prefilter is not very accurate.

To ensure that the digitizing of the signal does not reduce the available feedback, the sampling frequency must be higher than the crossover frequency by about an order of magnitude. Such a high sampling frequency is achievable by employing conventional technology including specialized digital processors, switch-capacitor filters, or hybrid controllers.

What has been described is a feedback control system compensator of the PID type, but employing a tilted midfrequency gain rather than a proportional gain. The TID controller of the invention allows for a closer approximation of Bode optimal response than PID controllers, which results in about 4 dB better disturbance rejection at a frequency one-half the crossover frequency. Designing and tuning TID controllers is as easy or easier and as fast or faster than designing and tuning PID controllers. TID control is robust, and its transient response to command input ratio remains good over a wider range of plant parameter variations.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

I claim:

1. A multiple parameter tunable compensator system for use in a feedback control system, the compensator being located between a first summer and a second summer, a feedback path being connected to the first summer, said compensator having:
   an input for receiving a signal, the input being connected to three control paths, each control path employing a tunable element;
   the first control path employing an integral compensator having a transfer function $I/s$;
   the second control path employing a derivative compensator having a transfer function $Ds$;
   the third control path employing a tilt compensator having a transfer function $T/s^{(1/n)}$, wherein n is a nonzero real number, I, D, and T are real numbers, and s is the operational variable; and
   means for outputting the three outputs of the three compensators.

2. The compensator system of claim 1, wherein n is between 2 and 3.

3. The compensator system of claim 1, wherein said system further includes a prefilter.

4. The compensator of claim 3, said prefilter having a transfer function $R(s)$ characterized by:
$$R(s) = (s^2 + 2\omega_b s + \omega_b^2)/(s^2 + 5.25\omega_b s + \omega_b^2),$$

the term $w_b$ being defined as a crossover frequency ($f_b$) multiplied by $2\pi$.

5. A feedback control system, comprising:
   a prefilter for receiving a control signal from a plant, said prefilter outputting a filtered control signal along a control path;
   a summer for receiving said filtered signal along said control path from said prefilter and a feedback signal along a feedback path and for summing said filtered control signal and said feedback signal to yield a summed signal;
   a three-component compensator having, in parallel, an integral compensator unit, a tilt compensator unit, and a derivative compensator unit, each unit of said three-component compensator receiving said summed signal, with said integral compensator unit having a transfer function $I/s$;
   said derivative compensator having a transfer function $Ds$; and
   said tilt compensator having a transfer function $T/s^{(1/n)}$, wherein n is a nonzero real number;
   a second summer for receiving and summing compensated signals from each of unit of said three unit compensator; and
   a control for controlling said plant in response to said compensated signal received from said three-component compensator, with said feedback path being connected between said controller and said first summer.

6. In a feedback loop control system having a three-component PID-type compensator with a proportional compensator, a derivative compensator, and an integral compensator, the three compensators connected in parallel and having a common input, wherein the PID compensator is located between a first summer connected to a feedback path and a second summer, an improvement comprising:
   replacing said proportional compensator with a tilt compensator having a transfer function characterized by $1/s^{(1/n)}$, wherein n is a nonzero real number.

* * * * *

UNITED STATES PATENT AND TRADEMARK OFFICE
CERTIFICATE OF CORRECTION

PATENT NO. : 5,371,670
DATED : December 6, 1994
INVENTOR(S) : Boris J. Lurie

It is certified that error appears in the above-indentified patent and that said Letters Patent is hereby corrected as shown below:

Col. 1, line 51, after "is" delete "a" and insert --the--;

Col. 4, line 65, delete "e=r$_f$±b" and insert --e=r$_f$-b--;

Col. 6, line 42, delete "timing" and insert --tuning--;

Col. 7, line 40, delete "notches" and insert --notch--; insert --a-- before "rather".

Col. 10, line 1, delete "w$_b$" and insert --$\omega_b$--; line 29, delete "controller" and insert --plant--.

Signed and Sealed this

Thirtieth Day of May, 1995

*Attest:*

BRUCE LEHMAN

*Attesting Officer*     *Commissioner of Patents and Trademarks*